Patented Jan. 25, 1927.

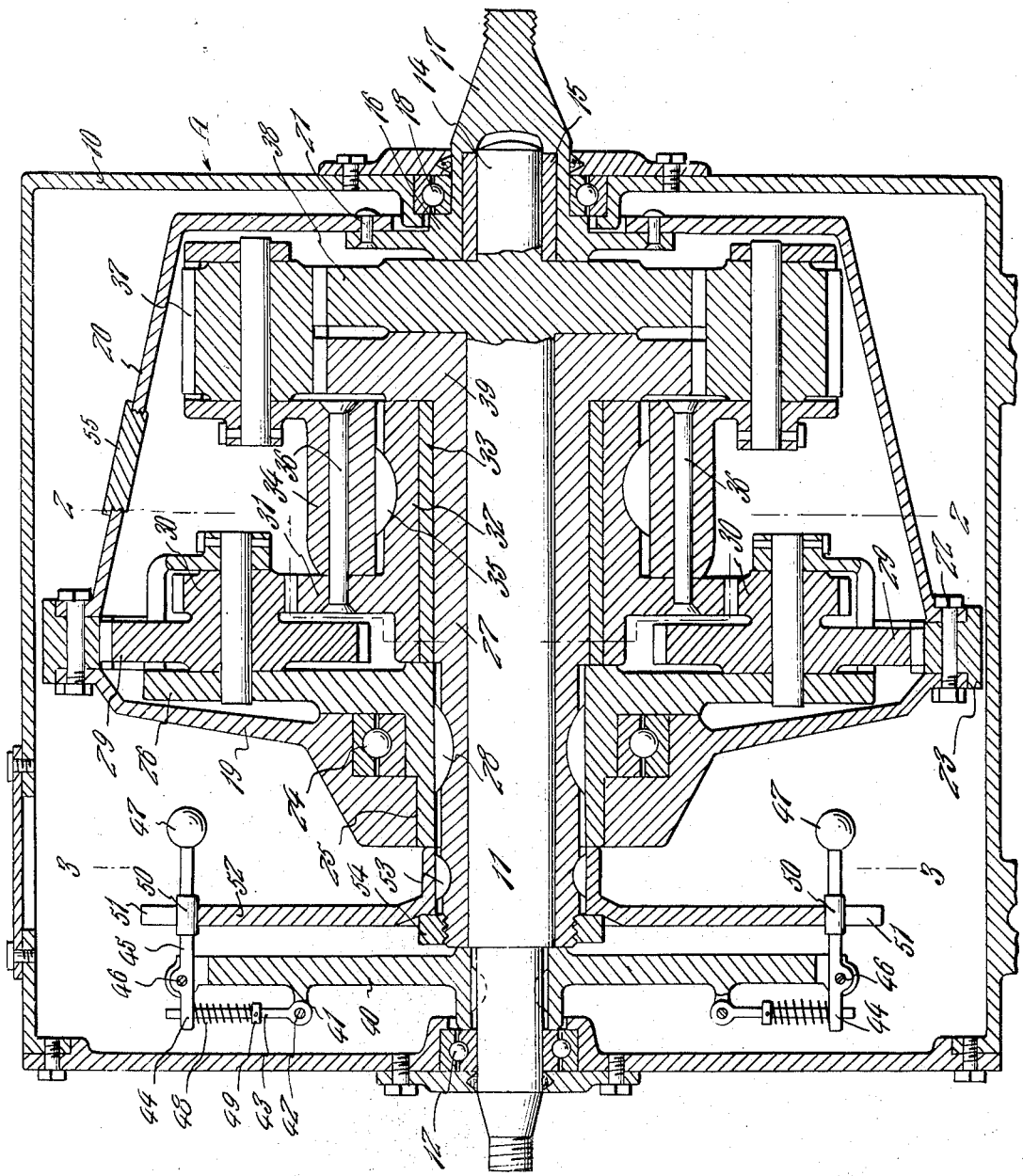

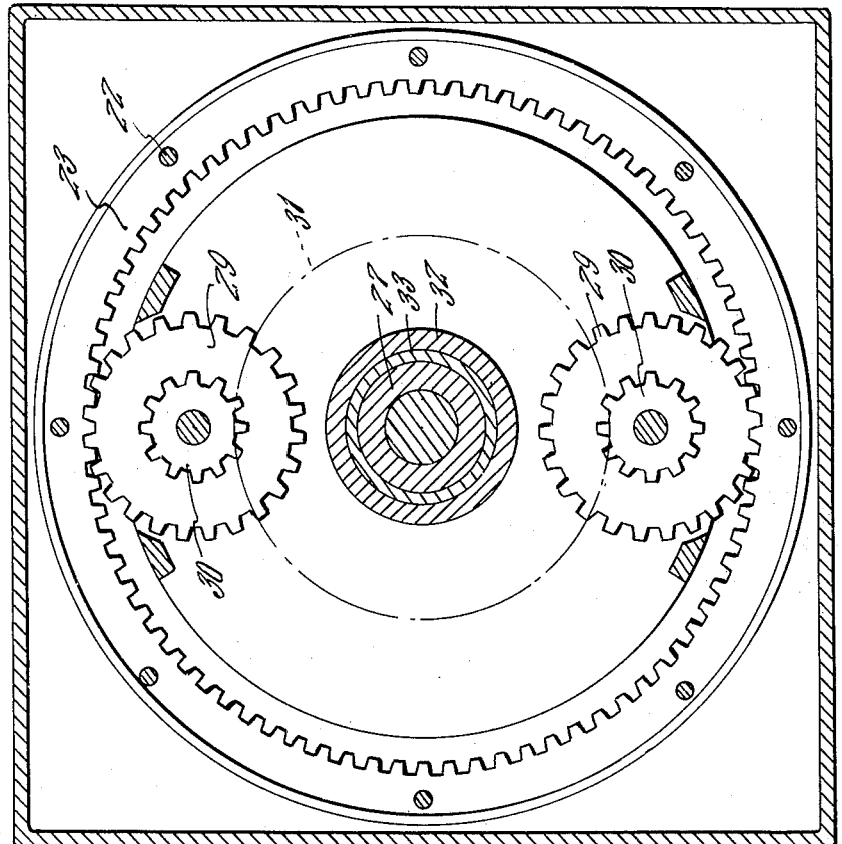
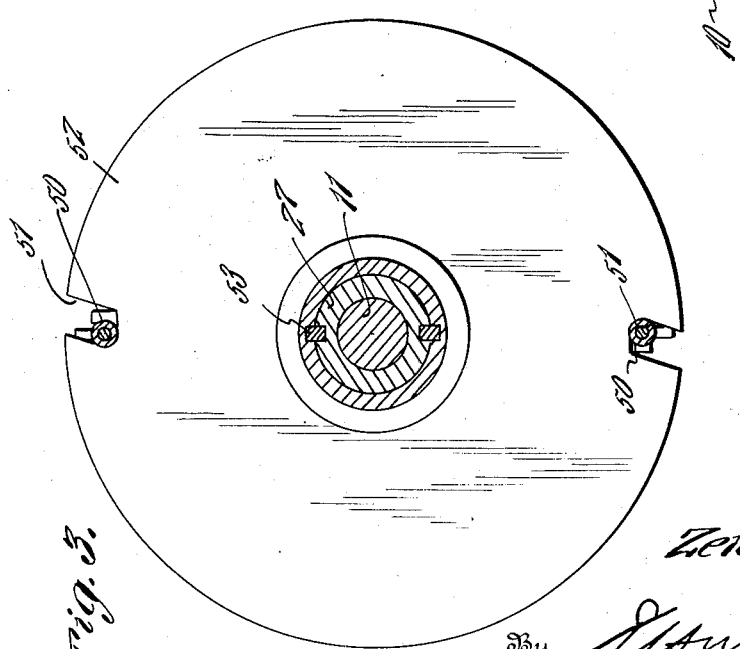

1,615,207

UNITED STATES PATENT OFFICE.

ZENO ALEXANDER, OF KANSAS CITY, MISSOURI.

TRANSMISSION.

Application filed July 22, 1925. Serial No. 45,234.

The object of the invention is to provide a transmission in which the driving and driven elements are so connected that with a constant speed and torque for the former, the latter may drop off in speed with a proportional increase in torque to make up for varying load conditions, such as are found in the propulsion of auto vehicles. Thus the interposition of a clutch between the driving motor and the transmission becomes unnecessary, as when manual means must be employed to effect a change in gear ratio between the elements of the transmission.

With this object in view, the invention consists in a construction and combination of parts of which a preferred embodiment is illustrated in the accompanying drawings, wherein:

Figure 1 is a central longitudinal sectional view of the invention.

Figure 2 is a transverse sectional view on the plane indicated by the line 2—2 of Figure 1.

Figure 3 is a transverse sectional view on the plane indicated by the line 3—3 of Figure 1.

Completely housed within the casing 10, the transmission comprises driving and driven elements of which the shaft 11 of the former rotates in an antifriction bearing 12 in the forward removable wall of the casing through which it protrudes for connection to the driving motor or engine. At the rear end, the shaft 11 has a journal 14 supported in a sleeve bearing 15 carried in a hub 16 formed as an integral part of the stub shaft 17 projecting through the rear wall of the casing for connection to the load, such as the propeller shaft of an auto vehicle. The stub shaft rotates in an antifriction bearing 18 supported in the rear wall of the casing.

Disposed in surrounding relation to the drive shaft is a rotary casing consisting of forward and rear castings 19 and 20, the rear casting being secured to the hub 16 as by rivets 21 and the two castings being united by bolts 22 which serve to secure them to an annular gear 23, this gear being interposed between the two castings. The rotary casing thus rotates with the stub shaft 17 and thus with the load, the bearing 18 serving as its rear bearing and antifriction bearing 24 serving as its forward bearing, this bearing being exterior to and in surrounding relation with the hub portion 25 of a planet carrier 26, the planet carrier being carried by a sleeve 27 to which it is keyed, as at 28. This planet carrier carries the planet gears 29 meshing with the annular gear 23 and with each gear 29 is formed an integral pinion 30, these pinions 30 meshing with a gear 31 formed as a part of the sleeve 32 bushed, as at 33, for rotation around the sleeve 27.

A second planet carrier 34 is carried by the sleeve 32, being keyed to the latter, as indicated at 35, and being further secured, as by rivets 36 which extend through the gear 31. The planet carrier 34 carries the pinions 37 which mesh with the gears 38 and 39, the former being carried by the drive shaft 11 and the latter by the sleeve 27. As shown, the gears are formed as integral parts of the shaft and sleeve but obviously may be made separate and secured thereto in any suitable manner.

Mounted on the shaft 11 at the forward end but to the rear of the forward wall of the casing is a governor head 40 provided with laterally projecting ears 41 between which are disposed for pivotal movement on the studs 42, the eyes of rods 43, these rods extending through eyes 44 in the extremities of the governor arms 45 pivoted to the governor head 40 at the periphery, as indicated at 46. The free extremities of the governor arms are weighted, as indicated at 47, and they are impelled normally inward by compression springs 48 surrounding the rods 43 and compressed between the eyes 44 and adjustable collars 49 mounted on the rods 43. The governors at intermediate points are provided with rollers 50 movable in slots 51 formed in the periphery of the disk 52. The slots are disposed at an angle to the radius of the disk and the latter is carried by the sleeve 27, being keyed to the sleeve, as indicated at 53, and being further secured as by a nut 54 threaded on the sleeve and bearing against the disk.

In the description of the operation, let it be assumed that the structure is viewed as indicated by the arrow A in Figure 1. If, when the driving motor is started, the direction of rotation of the shaft 11 is right handedly, the direction of rotation of the gear 38 will be right handedly. Let the stub shaft 17 be under load; then the rotation of the casing 19—20 is opposed. Since the gears 38 and 39 are of the same diameter, meshing with the common planetary pinions 37, the gear 39 and with it the sleeve 27 will rotate right handedly at the same angular speed as the driver 11. Since the carrier 26 is fixed to the sleeve 27, its angular movement will be the same as the sleeve and therefore the same as the driver. If the casing 19—20 which is directly connected to the load moves at any angular speed below that of the carrier 26, there will be rotation of the planetary gears 29—30 on their own axes and their direction of rotation will be left handedly, resulting in a right handed rotation of the carrier 34 since it is positively connected with the gear 31 with which the pinions 30 mesh. With nothing to restrain it, the carrier 34 is free to move and under such conditions, the casing 19—20 and therefore the load might remain at rest with the driver running at full speed, the planet gears 29 under these conditions rotating on their own axes left handedly, with the carrier 26 running at the same angular speed as the driver and in the same direction. Being integral with the planet gears 29, the pinions 30 would have the same angular speed as the planet gears 29 and running left handedly, would rotate the gear 31 right handedly and therefore move the carrier 34 right handedly, its angular velocity with respect to that of the driver depending on the gear ratio. The casing 19—20 and therefore the load can remain at rest with the driver moving only when the carrier 34 is free to rotate. The governor, however, is employed to resist this. Upon the rotation of the driving member, centrifugal force tends to swing the governor balls 47 outwardly and therefore the rolls 50 traverse the cam slots 51 in the disk 52. These cam slots being disposed at angles to the radius of the disk and the movement of the governor arms being in radial directions, a slight relative or turning movement between the driver 11 and sleeve 27 is effective, tending to disalign the teeth on the gears 38 and 39, thus imposing a resistance to turning movement of the pinions 37 on their own axes. If the load be light enough, the effect of the operation of the governors will be sufficient to completely stop axial rotation of the pinions 37 and the planet carrier 34 will then rotate in synchronism with the driver and the planet carrier 26 always rotating in synchronism with the driver, there can be no axial rotation of the planet gears 29—30, so that the casing 19—20 and the load will move at driver's speed.

When the load increases, as when the apparatus is used in connection with a vehicle and the latter is ascending an incline, the casing 19—20 may drop below the angular speed of the driver, this condition always being attended with the rotation of the planet gears 29—30 on their own axes and therefore the rotation of the planet carrier 34 at a different angular speed from the driver, the pinions 37 under these conditions undergoing axial rotation despite the restraining force provided by the governors in their tendency to disalign the teeth 39 and 38.

The rotary casing consisting of the castings 19 and 20 serves to house all the gears comprised in the mechanism and may be filled with a suitable lubricant through the opening closed by the removable cap 55.

The invention having been described, what is claimed as new and useful is:

1. A transmission having driving and driven members, a pair of planet carriers of which one has planetary gears operatively connecting it with the driving member, operative connections between the two planet carriers, planetary gearing connecting the other of said planet carriers with the driven member, and an automatic governor controlling the geared connection with the driving member and with the first carrier.

2. A transmission having driving and driven members, a pair of planet carriers of which one has planetary gears operatively connecting it with the driving member, operative connections between the two planet carriers, planetary gearing connecting the other of said planet carriers with the driven member, and an automatic governor controlling the geared connection with the driving member, said governor being carried by the driving member.

3. A transmission having driving and driven members, a pair of planet carriers of which one has planetary gears operatively connecting it with the driving member, operative connections between the two planet carriers, planetary gearing connecting the other of said planet carriers with the driven member, and an automatic governor controlling the geared connection with the driving member, said governor being carried by the driving member and actuated thereby.

4. A transmission comprising driving and driven members, a pair of gear-connected planet carriers each of which is provided with planetary gears, the gears of one of said carriers operatively connecting it with the driving member and those of the other carrier operatively connecting it with the driven member, and means for retarding the rotation of the gears of the first carrier on their own axes.

5. A transmission comprising driving and driven members, a pair of gear-connected planet carriers each of which is provided with planetary gears, the gears of one of said carriers operatively connecting it with the driving member and those of the other carrier operatively connecting it with the driven member, and a driver-actuated governor for controlling the rotation of the gears of the first carrier on their own axes.

6. A transmission comprising driving and driven members, a planet carrier having planetary gears, the driver having a gear meshing with said planetary gears, a second planet carrier having planetary gears, a gear corresponding to and concentric with the gear of the driver and meshing with the planetary gears of the first carrier, said last named gear being operatively connected with the second planet carrier, the planetary gears of the second carrier operatively connecting with the driven member and with the first carrier, and a governor for effecting relative angular movement between the gear of said driver and said corresponding gear to retard the rotation of the gears of the first said carrier on their own axes.

7. A transmission comprising driving and driven members, a planet carrier having planetary gears, the driver having a gear meshing with said planetary gears, a second planet carrier having planetary gears, a gear corresponding to and concentric with the gear of the driver and meshing with the planetary gears of the first carrier, said last named gear being operatively connected with the second planet carrier, the planetary gears of the second carrier operatively connecting with the driven member and with the first carrier, a governor for effecting relative angular movement between the gear of said driver and said corresponding gear to retard the rotation of the gears of the first said carrier on their own axes, said governor comprising a head and pivotally mounted governor arms carried thereby, and a disk operatively connected with the gear corresponding to the gear on said driver and having cam slots in which said governor arms operate.

8. A transmission comprising driving and driven members, a planet carrier having planetary gears, the driver having a gear meshing with said planetary gears, a second planet carrier having planetary gears, a gear corresponding to and concentric with the gear of the driver and meshing with the planetary gears of the first carrier, said last named gear being operatively connected with the second planet carrier, the planetary gears of the second carrier operatively connecting with the driven member and with the first carrier, a governor for effecting relative angular movement between the gear of said driver and said corresponding gear to retard the rotation of the gears of the first said carrier on their own axes, said governor comprising a head and pivotally mounted governor arms carried thereby, and a disk operatively connected with the gear corresponding to the gear on said driver and having cam slots in which said governor arms operate, said governor arms being spring impelled in one direction and actuated by centrifugal force in opposition to said spring.

In testimony whereof he affixes his signature.

ZENO ALEXANDER.